(12) United States Patent
Hirama

(10) Patent No.: US 11,361,465 B2
(45) Date of Patent: Jun. 14, 2022

(54) IMAGE CAPTURING APPARATUS AND CONTROL METHOD THEREOF, AND ORIENTATION ANGLE CALCULATION APPARATUS FOR ESTIMATING ORIENTATION OF IMAGE CAPTURING APPARATUS

(71) Applicant: CANON KABUSHIKI KAISHA, Tokyo (JP)

(72) Inventor: Tomohiro Hirama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/845,679

(22) Filed: Apr. 10, 2020

(65) Prior Publication Data

US 2020/0342618 A1 Oct. 29, 2020

(30) Foreign Application Priority Data

Apr. 24, 2019 (JP) .............................. JP2019-083211

(51) Int. Cl.
| | | |
|---|---|---|
| *G01C 1/00* | (2006.01) | |
| *G06T 7/70* | (2017.01) | |
| *G01C 21/08* | (2006.01) | |
| *G01P 13/00* | (2006.01) | |
| *G01P 15/08* | (2006.01) | |
| *G01P 3/00* | (2006.01) | |
| *G06T 7/223* | (2017.01) | |

(52) U.S. Cl.
CPC ................. *G06T 7/70* (2017.01); *G01C 1/00* (2013.01); *G01C 21/08* (2013.01); *G01P 3/00* (2013.01); *G01P 13/00* (2013.01); *G01P 15/08* (2013.01); *G06T 7/223* (2017.01)

(58) Field of Classification Search
None
See application file for complete search history.

(56) References Cited

U.S. PATENT DOCUMENTS

2005/0168597 A1* 8/2005 Fisher ................ H04N 21/4334
348/231.3
2016/0011004 A1* 1/2016 Matsumoto ............ G01C 21/16
702/96

(Continued)

FOREIGN PATENT DOCUMENTS

JP 2013200162 A 10/2013

*Primary Examiner* — Edemio Navas, Jr.
(74) *Attorney, Agent, or Firm* — Carter, DeLuca & Farrell LLP

(57) ABSTRACT

An image capturing apparatus comprises an angular velocity detection sensor that detects an angular velocity, an acceleration detection sensor that detects an acceleration, a motion vector detection unit that detects a motion vector on the basis of an image captured by the image capturing apparatus; and a calculation unit that calculates an orientation angle of the image capturing apparatus on the basis of a detection value from the angular velocity detection sensor, a detection value from the acceleration detection sensor, and a detection value from the motion vector detection unit, wherein the calculation unit corrects an output of the angular velocity detection sensor using the detection value obtained by the motion vector detection unit, and calculates an orientation angle of the image capturing apparatus on the basis of the corrected value.

11 Claims, 9 Drawing Sheets

(56) References Cited

U.S. PATENT DOCUMENTS

| | | | | |
|---|---|---|---|---|
| 2017/0237984 A1* | 8/2017 | Kwon | ............... | H04N 19/139 |
| | | | | 375/240.02 |
| 2018/0315167 A1* | 11/2018 | Akiyama | ........... | G06K 9/00791 |
| 2018/0336691 A1* | 11/2018 | Suzuki | ................ | H04N 5/2256 |
| 2019/0086573 A1* | 3/2019 | Aloui | ...................... | G01V 3/08 |

* cited by examiner

IMAGE CAPTURING APPARATUS AND CONTROL METHOD THEREOF, AND ORIENTATION ANGLE CALCULATION APPARATUS FOR ESTIMATING ORIENTATION OF IMAGE CAPTURING APPARATUS

BACKGROUND OF THE INVENTION

Field of the Invention

The present invention relates to a technique, used in an image capturing apparatus which requires orientation information, for estimating the orientation of the image capturing apparatus using a plurality of sensors.

Description of the Related Art

For some time, methods have been known in which the orientation of a moving object is estimated using a sensor device including an angular velocity sensor, an accelerometer, and a geomagnetism sensor. Relative orientation changes can be calculated from detection results from the angular velocity sensor. The orientation can be estimated by integrating these orientation changes.

On the other hand, output values from the angular velocity sensor contain error, and thus continuing to integrate the output values from the angular velocity sensor will result in the calculated orientation gradually deviating from the true value. A method has therefore been proposed in which the output values from an angular velocity sensor are corrected using the output of a geomagnetism sensor.

For example, Japanese Patent Laid-Open No. 2013-200162 discloses a compact orientation sensor that uses a Kalman filter to estimate and output a quaternion expressing a current orientation on the basis of output values from a sensor device including an angular velocity sensor, an accelerometer, and a geomagnetism sensor.

However, the technique disclosed in Japanese Patent Laid-Open No. 2013-200162 has the following problem. In Japanese Patent Laid-Open No. 2013-200162, it is necessary to calculate an estimated value of the quaternion on the basis of output values from an angular velocity sensor, an accelerometer, and a geomagnetism sensor which measure the angular velocity of a moving object on three independent axes of the object. However, the quaternion cannot be estimated in situations where an accurate output value cannot be obtained from the geomagnetism sensor, such as when a metal object is nearby, when moving to a location where geomagnetism cannot be obtained, when the geomagnetism sensor is not calibrated, and so on. The technique disclosed in Japanese Patent Laid-Open No. 2013-200162 may therefore be unable to estimate the orientation accurately.

SUMMARY OF THE INVENTION

Having been achieved in light of the above-described problem, the present invention provides an image capturing apparatus which can estimate an orientation accurately when estimating the orientation on the basis of output values from an angular velocity sensor and an accelerometer, even in situations where an output value cannot be obtained from a geomagnetism sensor.

According to a first aspect of the present invention, there is provided an image capturing apparatus, comprising: an angular velocity detection sensor that detects an angular velocity of movement of the image capturing apparatus; an acceleration detection sensor that detects an acceleration of movement of the image capturing apparatus; and at least one processor or circuit configured to function as: a motion vector detection unit that detects a motion vector on the basis of an image captured by the image capturing apparatus; and a calculation unit that calculates an orientation angle of the image capturing apparatus on the basis of a detection value from the angular velocity detection sensor, a detection value from the acceleration detection sensor, and a detection value from the motion vector detection unit, wherein the calculation unit corrects an output of the angular velocity detection sensor using the detection value obtained by the motion vector detection unit, and calculates an orientation angle of the image capturing apparatus on the basis of the corrected value.

According to a second aspect of the present invention, there is provided a control method for an image capturing apparatus, the method comprising: detecting an angular velocity of movement of the image capturing apparatus; detecting an acceleration of movement of the image capturing apparatus; detecting a motion vector on the basis of an image captured by the image capturing apparatus; and calculating an orientation angle of the image capturing apparatus on the basis of a detection value from the detecting of an angular velocity, a detection value from the detecting of an acceleration, and a detection value from the detecting of a motion vector, wherein in the calculating, an output from the detecting of an angular velocity is corrected using the detection value obtained in the detecting of a motion vector, and an orientation angle of the image capturing apparatus is calculated on the basis of the corrected value.

According to a third aspect of the present invention, there is provided an orientation angle calculation apparatus, comprising: at least one processor or circuit configured to function as: an angular velocity obtainment unit that obtains angular velocity information of movement of an image capturing apparatus; an acceleration obtainment unit that obtains acceleration information of movement of an image capturing apparatus; a motion vector obtainment unit that obtains motion vector information based on an image captured by the image capturing apparatus; and a calculation unit that calculates an orientation angle of the image capturing apparatus on the basis of the angular velocity information obtained by the angular velocity obtainment unit, the acceleration information obtained by the acceleration obtainment unit, and the motion vector information obtained by the motion vector obtainment unit, wherein the calculation unit corrects the angular velocity information obtained by the angular velocity obtainment unit using the motion vector information obtained by the motion vector obtainment unit, and calculates the orientation angle of the image capturing apparatus on the basis of the corrected information.

Further features of the present invention will become apparent from the following description of exemplary embodiments with reference to the attached drawings.

DESCRIPTION OF THE EMBODIMENTS

Figure 1:
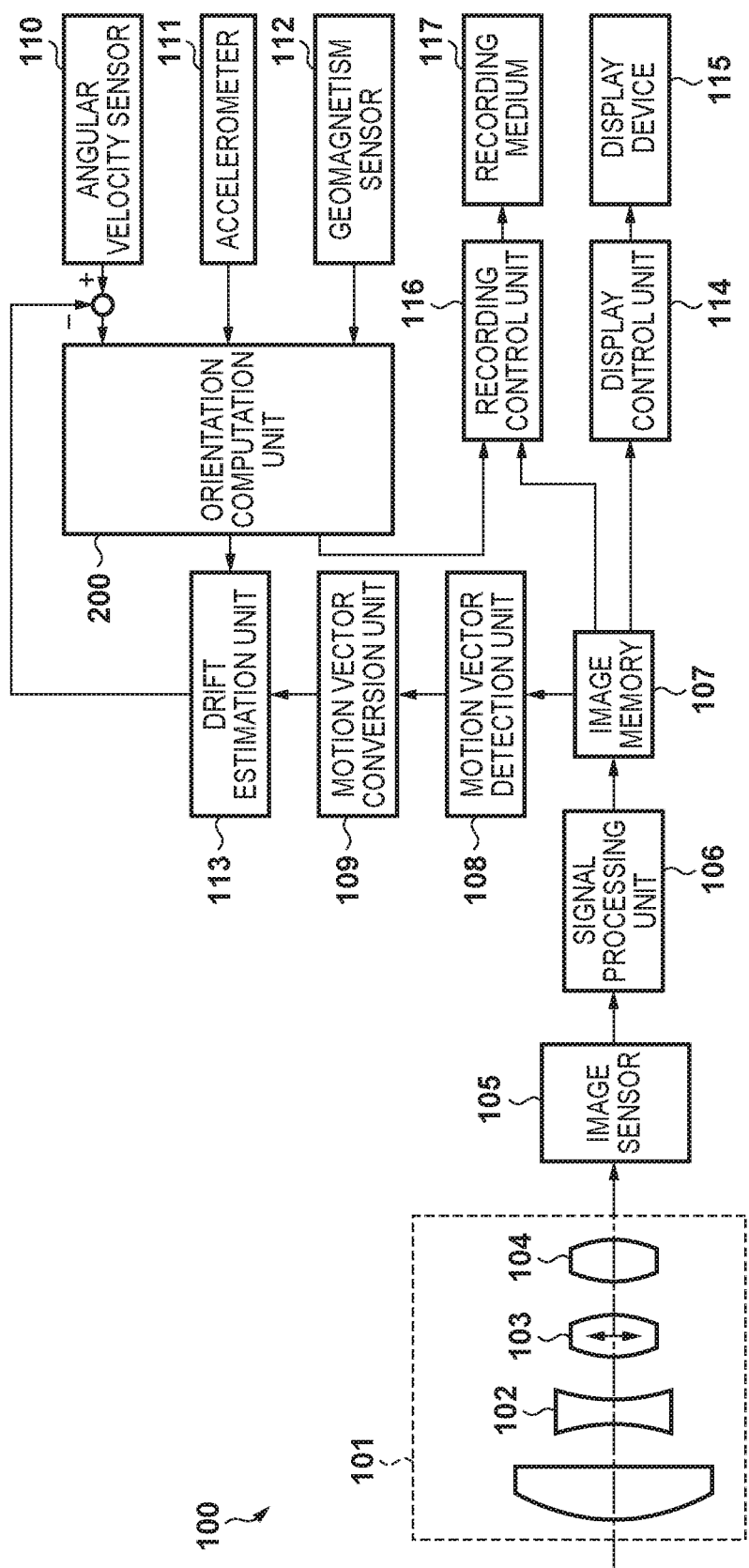
FIG. 1 is a block diagram illustrating the configuration of an image capturing system according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 2:
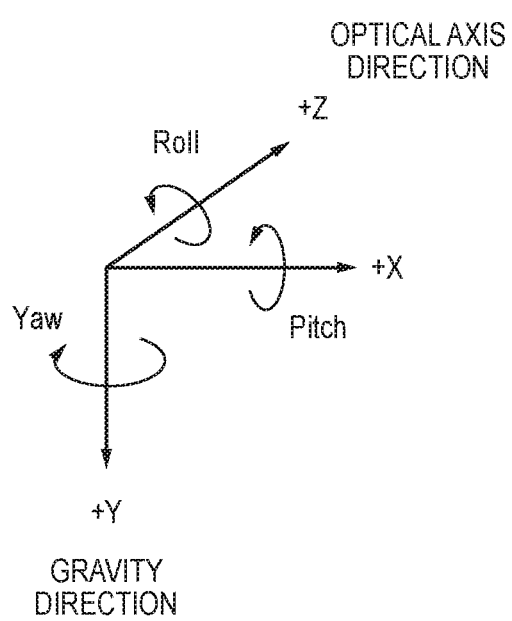
FIG. 2 is a diagram illustrating a coordinate system used in first and second embodiments.

Note that in the following descriptions of the embodiments, three types of motion act on an image capturing apparatus, i.e., in a yaw angle, a pitch angle, and a roll angle, as illustrated in FIG. 2.

First Embodiment

FIG. 1 is a block diagram illustrating the configuration of an image capturing system 100 according to a first embodiment of the present invention. The image capturing system 100 is an interchangeable-lens or a fixed-lens digital camera used mainly for shooting still images and moving images. However, the scope to which the present invention is applied is not limited to digital cameras, and the present invention can be applied in a variety of other types of image capturing systems as well.

As illustrated in FIG. 1, the image capturing system 100 is constituted by an interchangeable-lens camera including an interchangeable lens and a camera body, or by a fixed-lens camera, where the interchangeable lens is used by being attached to the camera body.

An image capturing lens 101 includes a zoom lens 102 which magnifies images, an image stabilization lens 103 such as a shift lens which stabilizes images, and a focus lens 104 which adjusts the focus. According to this configuration, the image capturing lens 101 carries out operations such as zooming, focusing, image stabilization, and the like, and a subject image is formed on an image sensor 105 as a result. Note that the configuration may be such that a plurality of the operations mentioned here, i.e., zooming, focusing, and image stabilization, are controlled and executed by the same lens.

The image sensor 105 is constituted by, for example, an XY addressing-based Complementary Metal Oxide Semiconductor (CMOS) image sensor or the like. The image sensor 105 photoelectrically converts an optical image formed by the image capturing lens 101 and accumulates the resulting charges, reads out the charges to generate an image signal constituted by a plurality of pixels, and supplies the image signal to a signal processing unit 106.

The signal processing unit 106 carries out signal processing such as white balance adjustment, gamma correction, and the like on the image signal output from the image sensor 105, and then stores a frame image generated as a result of the processing in image memory 107.

A motion vector detection unit (vector obtainment unit) 108 detects a motion vector in two directions, i.e., a horizontal direction and a vertical direction which are orthogonal to each other on a plane that itself is orthogonal to an optical axis, on the basis of an image signal from the signal processing unit 106 and an image signal stored in the image memory 107. The motion vector detection unit 108 will be described in detail later.

A motion vector conversion unit 109 converts the motion vector output from the motion vector detection unit 108 into an angle of rotation using a focal distance. An axis of rotation Y in the vertical direction (a yaw axis) and an axis of rotation X in the horizontal direction (a pitch axis) are set to axes orthogonal to each other on the plane that is orthogonal to the optical axis, and a yaw angle and a pitch angle, which are angles of rotation about the respective axes, are output to a drift estimation unit 113. The motion vector conversion unit 109 will be described in detail later.

An angular velocity sensor (angular velocity detection unit, angular velocity obtainment unit) 110 is a sensor, such as a gyrosensor or the like, for detecting a change in an angular velocity acting on the image capturing apparatus 100. A detected angular velocity signal is output to an orientation computation unit 200. In the angular velocity sensor 110, three axes, i.e., the axis of rotation Y in the vertical direction (the yaw axis), the axis of rotation X in the horizontal direction (the pitch axis), and an axis of rotation Z in an optical axis direction (a roll axis), are defined as detection axes orthogonal to each other on a plane that is orthogonal to the optical axis. Three angular velocity sensors are provided so that angular velocities about these three axes can be detected. Note that the three angular velocity sensors may be implemented as a single unit, or as independent sensors.

An accelerometer (acceleration detection unit, acceleration obtainment unit) 111 is a sensor that detects a change in an acceleration of the image capturing apparatus 100. Here, as one example, gravitational acceleration is detected, using the fact that the earth's gravity vertically, from top to bottom. A detected acceleration signal is output to the orientation computation unit 200. In the accelerometer 111, three axes, i.e., the axis of rotation Y in the vertical direction (the yaw axis), the axis of rotation X in the horizontal direction (the pitch axis), and the axis of rotation Z in an optical axis direction (the roll axis), are defined as detection axes orthogonal to each other on a plane that is orthogonal to the optical axis. Three accelerometers are provided so that the accelerations in the directions of these three axes can be detected. Note that the three accelerometers may be implemented as a single unit, or as independent sensors.

A geomagnetism sensor (geomagnetism detection unit) 112 is a sensor that detects a change in magnetism acting on the image capturing apparatus 100. Here, as one example, the earth's magnetism is detected, using the fact that the earth's magnetic flux lines are oriented from south to north. Additionally, the geomagnetism sensor 112 detects a maximum magnetic flux density when each axis is oriented from the south to the north, and the direction of the maximum magnetic flux density is magnetic north rather than true north. A detected geomagnetism signal is output to the orientation computation unit 200. In the geomagnetism sensor 112, three axes, i.e., the axis of rotation Y in the vertical direction (the yaw axis), the axis of rotation X in the horizontal direction (the pitch axis), and the axis of rotation Z in the optical axis direction (the roll axis), are defined as detection axes orthogonal to each other on a plane that is orthogonal to the optical axis. Three geomagnetism sensors are provided so that the geomagnetisms in the directions of these three axes can be detected. Note that the three geomagnetism sensors may be implemented as a single unit, or as independent sensors.

The drift estimation unit 113 estimates a drift amount, which is error (calculation error) arising when the orientation computation unit 200 (described later) computes an orientation, on the basis of the output from the motion vector conversion unit 109 and the output from the orientation computation unit 200. The drift estimation unit 113 will be described in detail later.

A display control unit 114 outputs an image signal supplied from the image memory 107 and causes an image to be displayed in a display device 115. The display control unit 114 also displays an indication that the geomagnetism is unreliable in the display device 115 when an output M_Calibration from a geomagnetism determination unit 204 (described later; see FIG. 4) is "false". The display control unit 114 drives the display device 115, and the display device 115 displays images using a liquid-crystal device (an LCD) or the like.

A recording control unit 116 outputs and records, into a recording medium 117, an image signal supplied from the image memory 107 and an output value from the orientation computation unit 200 (described later), in synchronization with each other, when the image signal has been instructed to be recorded by an operating unit used to instruct recording to start or stop (not shown) being operated. The recording medium 117 is an information recording medium such as semiconductor memory, a magnetic recording medium such as a hard disk, or the like.

FIG. 2 is a diagram illustrating three axes in an absolute coordinate system, and an absolute angle of rotation for each axis, expressing an orientation. The "absolute coordinate system" is a fixed coordinate system where, once set, the position of the origin, the directions of the coordinate axes, and the like do not change, and is, in the present embodiment, a coordinate system in a situation where the image capturing system 100 is arranged horizontally relative to the earth. A coordinate system which can move, rotate, and the like, as is the case with an inertia sensor, is a "sensor coordinate system". An axis corresponding to the direction of earth's gravity is taken as a Y axis, and a horizontal angle of rotation about the Y axis is taken as the yaw angle. When the image capturing system 100 is arranged horizontal relative to the earth, the optical axis corresponds to a Z axis, and the angle of rotation about the Z axis is taken as the roll angle. The remaining one axis is taken as an X axis, and the angle of rotation about the X axis is taken as the pitch angle. The yaw angle, pitch angle, and roll angle in the absolute coordinate system are all Eulerian angles.

The motion vector detection unit 108 illustrated in FIG. 1 will be described here. The motion vector detection unit 108 detects a motion vector in two directions, i.e., a horizontal direction and a vertical direction which are orthogonal to each other on a plane that is orthogonal to an optical axis. To describe this in detail, first, motion vector detection methods include a correlation method, a block matching method, and the like. Here, it is assumed that the motion vector detection unit 108 uses a block matching method as one example.

In this block matching method, an input image signal is first divided into a plurality of blocks having an unspecified size (e.g., blocks that are 16 pixels by 16 pixels), and a difference from the pixels in a set range, e.g., the previous field or frame, is calculated on a block-by-block basis. The block in the previous field or frame with which the sum of the absolute values of the differences is the smallest is then searched out, and a relative shift of that block is detected as the motion vector of the block. As a result, movement amounts in the vertical direction and the horizontal direction (i.e., a motion vector) is found on a pixel-by-pixel basis. This motion vector expresses a movement amount of a captured image in two fields or two frames captured at different times, i.e., a movement amount of the image capturing apparatus during a period where captured images have been obtained from two fields or two frames to be compared. By computing this motion vector using the timings at which the captured images from the two fields or the two frames to be compared have been captured (e.g., the framerate), information indicating the movement amount of the image capturing apparatus per unit of time can be obtained. A motion vector error determination flag V_flag is set to "false" if the motion vector cannot be detected reliably, and to "true" in other cases. Conditions such as a luminance signal being low, a detection value being a peak value, and so on can be considered as examples of a motion vector error determination method.

The motion vector conversion unit 109 illustrated in FIG. 1 will be described here. The motion vector conversion unit 109 converts the motion vector output from the motion vector detection unit 108 into an angle of rotation using a focal distance. Note that the processing by the motion vector conversion unit 109 is executed repeatedly every given predetermined period. Specifically, when the detected motion vector is represented by (Yv, Xv), the focal distance is represented by f, and the yaw angle and pitch angle found from the motion vector are represented by ψv and θv respectively, the following Expressions 1 and 2 can be written.

$$\psi v = \tan^{-1}(Xv/f) \quad \text{Expression 1}$$

$$\theta v = \tan^{-1}(Yv/f) \quad \text{Expression 2}$$

The yaw angle ψv and pitch angle θv calculated through Expressions 1 and 2 continue to be integrated in each period of the processing. After the integration, the yaw angle is taken as ψv_int, the pitch angle is taken as θv_int, and these are output to the drift estimation unit 113.

The drift estimation unit 113 illustrated in FIG. 1 will be described here. Note that the processing is the same for the yaw angle and the pitch angle, and thus only the control pertaining to one of these angles will be described. The drift estimation unit 113 estimates orientation angle error as the drift amount, on the basis of the output from the motion vector conversion unit 109 and the output from the orientation computation unit 200 (described later). Detection error from the angular velocity sensor 110 can be given as a cause of computation error.

Figure 3:
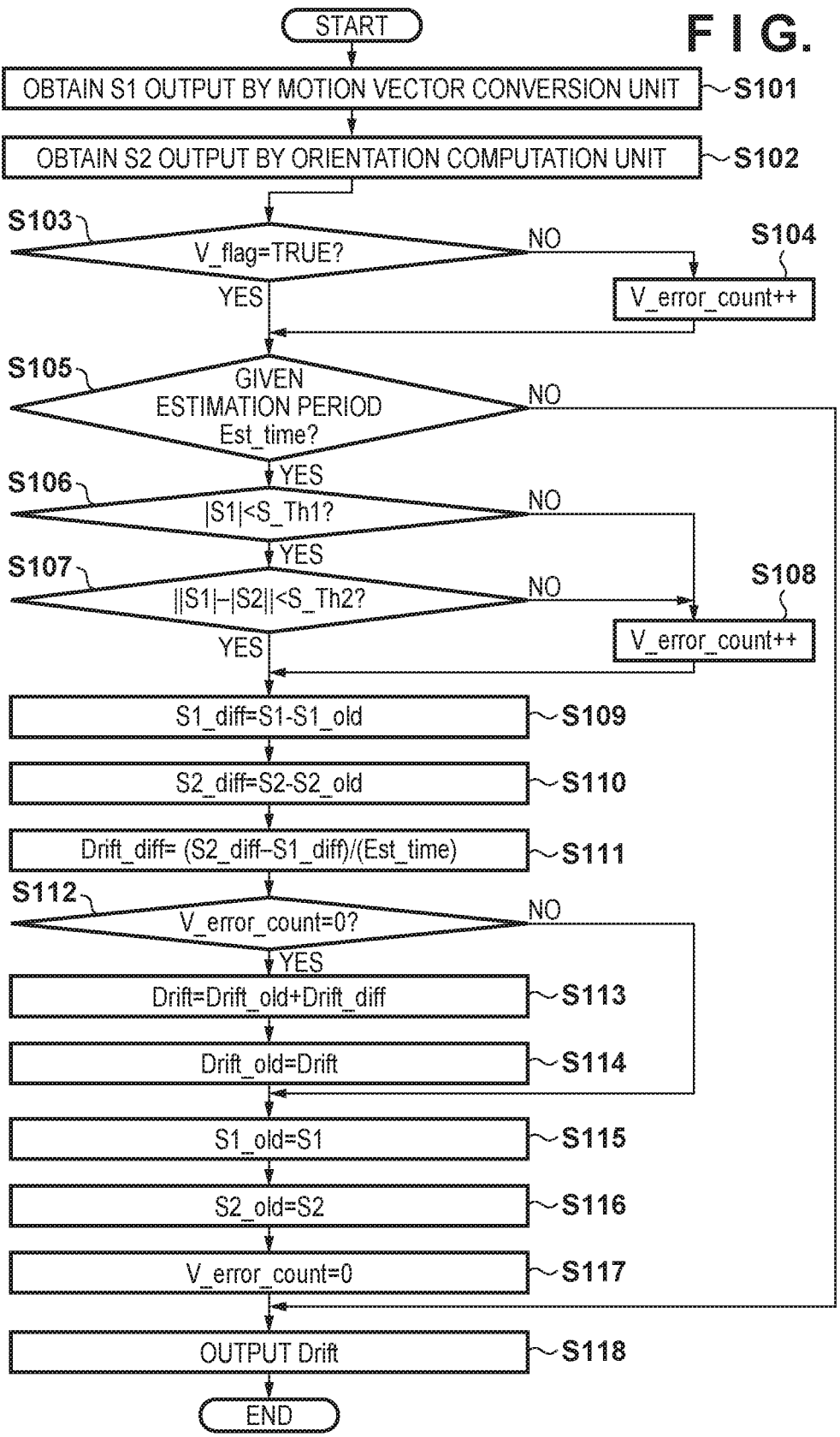
FIG. 3 is a flowchart illustrating drift amount calculation operations according to the first embodiment.

An example of an estimation method will be described with reference to the flowchart in FIG. 3. Note that the processing indicated in FIG. 3 is executed repeatedly every given predetermined period, such as every period of detection by the angular velocity sensor 110. Also, a given drift estimation period is represented by Est_time.

First, in step S101, the drift estimation unit 113 obtains an angle S1 output by the motion vector conversion unit 109 (e.g., the yaw angle ψv_int), after which the process moves to step S102. In step S102, the drift estimation unit 113 obtains an angle S2 output by the orientation computation unit 200 (described later) (e.g., a yaw angle ψG_int), after which the process moves to step S103.

In step S103, the drift estimation unit 113 determines whether the motion vector error determination flag V_flag is "true" or "false". If the flag is determined to be "false", the process moves to step S104, where the drift estimation unit 113 increments a vector error count V_error_count. If the flag is determined to be "true", the process moves to step S105.

In step S105, the drift estimation unit 113 determines whether the timing of the processing is the given drift estimation period Est_time. If the timing is not the given drift estimation period, the process moves to step S118, whereas if the timing is the given drift estimation period, the process moves to step S106.

In step S106, the drift estimation unit 113 compares an absolute value of the angle S1 with a predetermined limit value S_Th1, and determines whether or not the absolute value exceeds the limit value S_Th1. If it is determined that the absolute value of the angle S1 exceeds the limit value S_Th1, the process moves to step S108, where the drift estimation unit 113 increments the vector error count V_error_count. The process moves to step S107 if it is determined in step S106 that the absolute value of the angle S1 does not exceed the limit value S_Th1.

In step S107, the drift estimation unit 113 subtracts an absolute value of the angle S2 from the absolute value of the angle S1, furthermore compares that absolute value (called an "absolute value of the difference" hereinafter) with a predetermined limit value S_Th2, and determines whether or not the absolute value of the difference exceeds the limit value S_Th2. If it is determined that the absolute value of the difference exceeds the limit value S_Th2, the process moves to step S108, where the drift estimation unit 113 increments the vector error count V_error_count. The process moves to step S109 if it is determined in step S107 that the absolute value of the difference does not exceed the limit value S_Th2.

In step S109, the drift estimation unit 113 calculates a difference S1_diff by subtracting, from the angle S1, an output value S1_old from the motion vector conversion unit 109, obtained in the previous drift estimation period. In step S110, the drift estimation unit 113 calculates a difference S2_diff by subtracting, from the angle S2, an output value S2_old from the orientation computation unit 200, obtained in the previous drift estimation period.

In step S111, the drift estimation unit 113 calculates a drift estimation differential value Drift_diff by subtracting the difference S1_diff from the difference S2_diff and then dividing the result by the drift estimation period.

In step S112, the drift estimation unit 113 determines whether or not the vector error count V_error_count is 0. If the count is determined to be 0, the process moves to step S113, whereas if the count is determined to be a number aside from 0, the process moves to step S115.

In step S113, the drift estimation unit 113 calculates a drift estimated value Drift by adding a drift estimated value Drift_old calculated in the previous drift estimation period to the drift estimation differential value Drift_diff. In step S114, the drift estimation unit 113 updates the drift estimated value Drift_old calculated in the previous drift estimation period to the drift estimated value Drift calculated in the current drift estimation period.

In step S115, the drift estimation unit 113 updates an angle S1_old to the angle S1 obtained in the current drift estimation period. In step S116, the drift estimation unit 113 updates an angle S2_old to the angle S2 obtained in the current drift estimation period.

In step S117, the drift estimation unit 113 updates the vector error count V_error_count to the initial value of 0. In step S118, the drift estimation unit 113 outputs the drift estimated value Drift calculated in the current drift estimation period.

Figure 4:
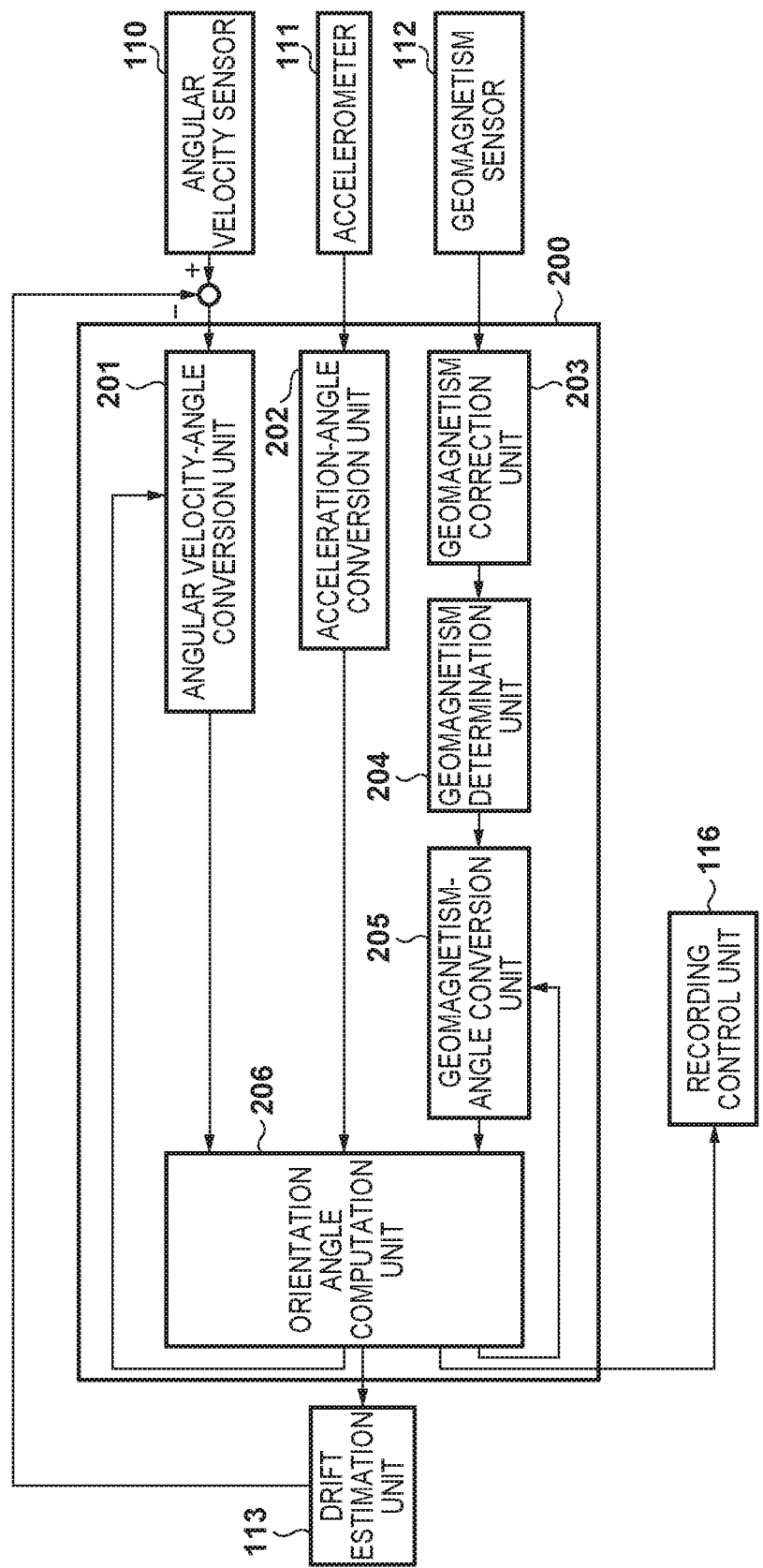
FIG. 4 is a block diagram illustrating an orientation computation unit according to the first embodiment.

Next, the orientation computation unit 200 will be described with reference to the block diagram in FIG. 4. An angular velocity-angle conversion unit 201 converts angular velocity data output from the angular velocity sensor 110 into an angle of rotation. First, because angular velocity data (ωy,ωx,ωz) output from the angular velocity sensor 110 is in the sensor coordinate system, the data is converted into angular velocities (differential values of angles of rotation) ($\psi'_G$, $\theta'_G$, $\varphi'_G$) in an absolute coordinate system (Eulerian angles) using Expression 3. Then, with a predetermined integration time represented by t, a yaw angle of an absolute angle of rotation about the Y axis, a pitch angle of an absolute angle of rotation about the X axis, and a roll angle of an absolute angle of rotation about the Z axis ($\psi_G, \theta_G, \varphi_G$) are calculated by integrating the results from Expression 3 (Expressions 4, 5, and 6). The calculated absolute angles ($\psi_G, \theta_G, \varphi_G$) are output to an orientation angle computation unit 206 (described later).

$$\begin{bmatrix} \dot{\psi}_G \\ \dot{\theta}_G \\ \dot{\varphi}_G \end{bmatrix} = \begin{bmatrix} 0 & \sin\varphi\sec\theta & \cos\varphi\sec\theta \\ 0 & \cos\theta & -\sin\phi \\ 1 & \sin\varphi\tan\theta & \cos\varphi\tan\theta \end{bmatrix} \begin{bmatrix} \omega_z \\ \omega_x \\ \omega_y \end{bmatrix} \quad \text{Expression 3}$$

$$\psi_G = \int_0^T \dot{\psi}_G(t)dt + \psi_0 \quad \text{Expression 4}$$

$$\theta_G = \int_0^T \dot{\theta}_G(t)dt + \theta_0 \quad \text{Expression 5}$$

$$\varphi_G = \int_0^T \dot{\varphi}_G(t)dt + \varphi_0 \quad \text{Expression 6}$$

An acceleration-angle conversion unit 202 converts acceleration data output from the accelerometer 111 into an angle of rotation. When at rest, the accelerometer 111 detects only gravitational acceleration, and thus when gravitational acceleration is represented by g (vertical direction acceleration when at rest), the yaw angle of the absolute angle of rotation about the Y axis, the pitch angle of the absolute angle of rotation about the X axis, and the roll angle of the absolute angle of rotation about the Z axis are represented by ($\psi,\theta,\varphi$), and Y axis direction, X axis direction, and Z axis direction acceleration data obtained from the accelerometer 111 are represented by (Ay,Ax,Az) respectively, Expressions 7 and 8 hold true.

$$\begin{bmatrix} A_z \\ A_x \\ A_y \end{bmatrix} = R^T \begin{bmatrix} 0 \\ 0 \\ g \end{bmatrix} \quad \text{Expression 7}$$

$$R = \begin{bmatrix} \cos\psi & -\sin\psi & 0 \\ \sin\psi & \cos\psi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\varphi & -\sin\varphi \\ 0 & \sin\varphi & \cos\varphi \end{bmatrix} \quad \text{Expression 8}$$

Expression 8 is a rotation matrix that converts from the sensor coordinate system to the absolute coordinate system. Expanding Expression 7, when the angles of rotation about the X axis and the Z axis, found from the acceleration data, are represented by ($\theta_A$, $\varphi_A$), respectively, the relationship indicated by Expressions 9, 10, and 11 is obtained. The calculated absolute angles ($\theta_A$, $\varphi_A$) are output to the orientation angle computation unit 206 (described later).

$$\begin{bmatrix} A_z \\ A_x \\ A_y \end{bmatrix} = \begin{bmatrix} -\sin\theta_g \\ \cos\theta \sin\varphi_g \\ \cos s\theta \cos\varphi_g \end{bmatrix} \quad \text{Expression 9}$$

$$\theta_A = \tan^{-1}\left(\frac{A_z}{\sqrt{(A_x^2 + A_y^2)}}\right) \quad \text{Expression 10}$$

$$\varphi_A = \tan^{-1}\left(\frac{A_x}{A_y}\right) \quad \text{Expression 11}$$

A geomagnetism correction unit 203 corrects the geomagnetism sensor on the basis of geomagnetism data output from the geomagnetism sensor 112. The correction of the geomagnetism sensor is called "calibration", and a method in which magnetic distortion and offset are removed while rotating the geomagnetism sensor horizontally and vertically can be given as an example of a method for calibrating the geomagnetism sensor. With this method, the magnetic distortion can be removed by finding a sensitivity from the output of the geomagnetism sensor, and the offset can be removed by finding an origin point. Even after calibration, the state of magnetization within the image capturing apparatus will change under the influence of strong magnetic fields. A known technique can be used for the calibration method, and thus detailed descriptions thereof will not be given here.

Once the calibration is complete, a geomagnetism determination result M_Calibration is set to "true", or to "false" if the calibration is not complete, and the geomagnetism data following the magnetic distortion correction and offset correction is output to the geomagnetism determination unit 204 as (My,Mx,Mz).

Figure 5:
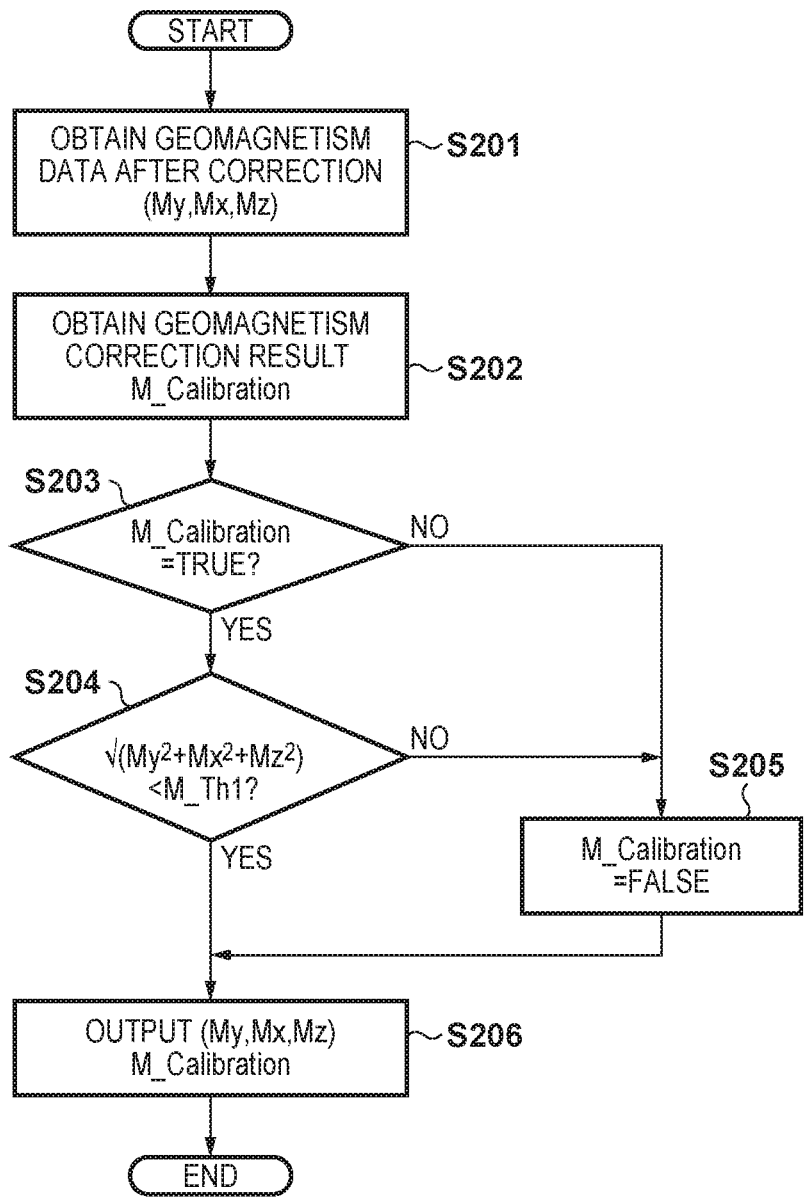
FIG. 5 is a flowchart illustrating operations for determining the reliability of geomagnetism according to the first embodiment.

The geomagnetism determination unit 204 determines the reliability of the geomagnetism data on the basis of the output from the geomagnetism correction unit 203. An example of a reliability determination method will be described with reference to the flowchart in FIG. 5. Note that the processing indicated in FIG. 5 is executed repeatedly every given predetermined period, such as every period of detection by the geomagnetism sensor 112.

First, in step S201, the geomagnetism determination unit 204 obtains the geomagnetism data corresponding to each axis, output by the geomagnetism correction unit 203 (My,Mx,Mz), after which the process moves to step S202. In step S202, the geomagnetism determination unit 204 obtains the geomagnetism determination result M_Calibration, and the process then moves to step S203.

In step S203, the geomagnetism determination unit 204 determines whether the geomagnetism determination result M_Calibration is "true" or "false", and the process moves to step S205 if it is determined that the result is "false". However, if in step S203 it is determined that the result is "true", the process moves to step S204.

In step S204, the geomagnetism determination unit 204 composites the geomagnetism data of each axis (My,Mx,Mz) using the Pythagorean theorem, compares the composited data ("composite data" hereinafter) with a predetermined limit value M_Th1, and determines whether or not that data exceeds M_Th1. If it is determined that the composite data exceeds the limit value M_Th1 (i.e., that the reliability is lower than a predetermined value), the process moves to step S205. However, if it is determined in step S204 that the composite data does not exceed the limit value M_Th1 (i.e., that the reliability is greater than or equal to the predetermined value), the process moves to step S206.

In step S205, the geomagnetism determination unit 204 sets the geomagnetism determination result M_Calibration to "false". A user is also notified, using the display device 115 or the like, that the reliability of the detection value from the geomagnetism sensor 112 is low. In step S206, the geomagnetism determination unit 204 outputs the geomagnetism data from each axis, output by the geomagnetism correction unit 203 (My,Mx,Mz), and the geomagnetism determination result M_Calibration, to the orientation angle computation unit 206.

Returning to FIG. 4, a geomagnetism-angle conversion unit 205 converts the geomagnetism data (My,Mx,Mz) output from the geomagnetism determination unit 204 into angles of rotation using orientation angle outputs ($\theta,\varphi$) from the orientation angle computation unit 206 (described later). When the geomagnetism sensor is horizontal, the sensor can calculate an azimuth angle, i.e., an absolute angle about the axis of rotation Y (the yaw axis) in the vertical direction. However, when the sensor is not horizontal, magnetic fields cannot be detected accurately, which leads to error. Such error arising when the sensor is not horizontal can be corrected using absolute angles pitch angle $\theta$ and roll angle $\varphi$. When the Y axis direction, X axis direction, and Z axis direction geomagnetism data obtained from the geomagnetism determination unit 204 are represented by (My,Mx,Mz) respectively, the Y axis direction, X axis direction, and Z axis direction geomagnetism data for which error has been corrected are represented by (My_com,Mx_com,Mz_com) respectively, and the yaw angle converted into an angle of rotation is represented by $\psi M$, the relationship indicated by Expressions 12 and 13 is obtained. The calculated angle of rotation $\psi M$ is output to the orientation angle computation unit 206 (described later).

$$\begin{bmatrix} M_{z\_com} \\ M_{x\_com} \\ M_{y\_com} \end{bmatrix} = \begin{bmatrix} \cos\theta & \sin\varphi\sin\theta & \cos\varphi\sin\theta \\ 0 & \cos\phi & -\sin\phi \\ -\sin\theta & \sin\varphi\cos\theta & \cos\varphi\cos\theta \end{bmatrix} \begin{bmatrix} M_z \\ M_x \\ M_y \end{bmatrix} \quad \text{Expression 12}$$

$$\psi_M = \tan^{-1}\left(\frac{-M_x}{M_{z\_com}}\right) \quad \text{Expression 13}$$

The orientation angle computation unit 206 calculates an orientation angle by using a Kalman filter to carry out sensor fusion on the data output from the angular velocity-angle conversion unit 201, the acceleration-angle conversion unit 202, and the geomagnetism-angle conversion unit 205. At this time, the Kalman filter sets a system matrix by taking the value to be estimated as a state value, and the information obtained from the sensors and the like as input values and observed values. Note that the Kalman filter is a filter which can continuously estimate an optimal state value in real time from a state equation (Expression 14) and an observation equation (Expression 15), and because the details thereof are known, they will not be described here. Here, x represents the state value, y represents the observed value, u represents the input value, and A, B, and C represent the system matrix. The subscript t expresses a point in time.

$$x(t+1) = A(t)x(t) + B(t)u(t) + m(t) \quad \text{Expression 14}$$

$$y(t) = C(t)x(t) + n(t) \quad \text{Expression 15}$$

Figure 6:
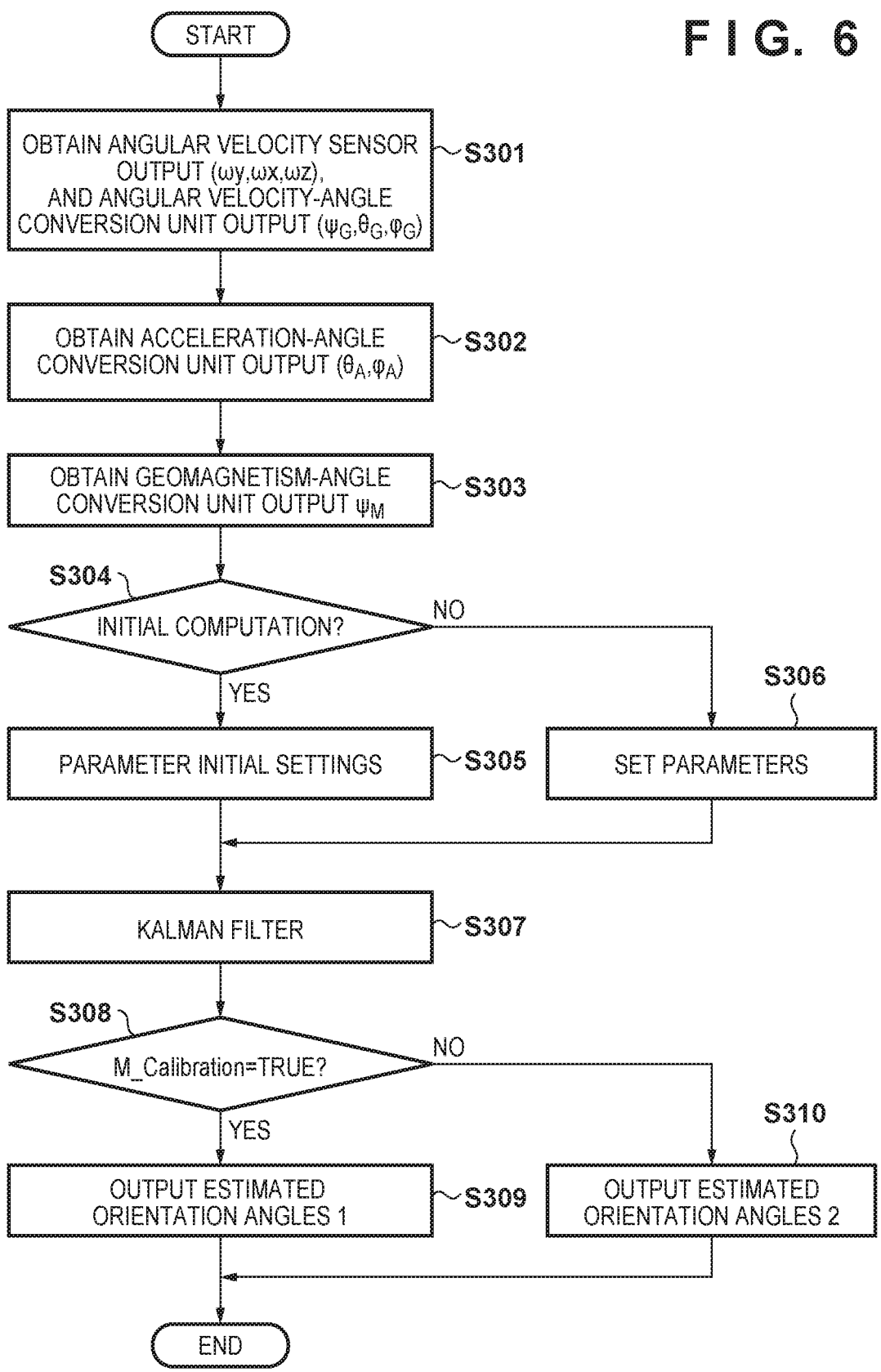
FIG. 6 is a flowchart illustrating orientation computation operations according to the first embodiment.

An example of the method for computing the orientation angle will be described with reference to the flowchart in FIG. 6. Note that the processing indicated in FIG. 6 is executed repeatedly every given predetermined period, such as every detection period of each sensor.

First, in step S301, the orientation angle computation unit 206 obtains angular velocities (ωy,ωx,ωz) by subtracting the drift estimated value Drift from the angular velocity data output from the angular velocity sensor 110, and angles of rotation ($\psi_G,\theta_G,\varphi_G$) about the Y axis, X axis, and Z axis, respectively, output from the angular velocity-angle conversion unit 201, after which the process moves to step S302.

In step S302, the orientation angle computation unit 206 obtains angles of rotation ($\theta_A,\varphi_A$) about the X axis and the Z axis, output from the acceleration-angle conversion unit 202, after which the process moves to step S303. In step S303, the orientation angle computation unit 206 obtains the yaw angle ψM output from the geomagnetism-angle conversion unit 205, after which the process moves to step S304.

In step S304, the orientation angle computation unit 206 determines whether or not this is the first process executed since the image capturing system 100 was started up. If it is determined not to be the first process, the process moves to step S306, whereas if it is determined to be the first process, the process moves to step S305.

In step S305, the orientation angle computation unit 206 sets various initial parameters of the Kalman filter. The angles of rotation ($\psi_G,\theta_G,\varphi_G$) obtained in step S301 are set for the initial Kalman filter state values. The angles of rotation ($\theta_A,\varphi_A$) obtained in step S302, and the yaw angle ψM obtained in step S303, are set as initial values for the observed values and estimated orientation angles (ψEst, θEst,φEst), and the angular velocities (ωy,ωx,ωz) obtained in step S301 are set for the input values. System matrices A(t), B(t), and C(t) are set as indicated by Expressions 16 and 17. A gain, white Gaussian noise, sensor noise, and estimated error amount appropriate for the constructed system are set for the initial value of a Kalman gain K, process noise m, observed noise n, and an error covariance matrix P, after which the process moves to step S307.

$$A_{(t)} = C_{(t)} = \begin{bmatrix} 1 & 0 & 0 \\ 0 & 1 & 0 \\ 0 & 0 & 1 \end{bmatrix} \qquad \text{Expression 16}$$

$$B_{(t)} = \begin{bmatrix} 0 & \sin\psi_{Est(t)}\sec\theta_{Est(t)} & \cos\psi_{Est(t)}\sec\theta_{Est(t)} \\ 0 & \cos\psi_{Est(t)} & -\sin\psi_{Est(t)} \\ 1 & \sin\psi_{Est(t)}\tan\theta_{Est(t)} & \cos\psi_{Est(t)}\tan\theta_{Est(t)} \end{bmatrix} \qquad \text{Expression 17}$$

In step S306, the orientation angle computation unit 206 sets the parameters of the Kalman filter. The angles of rotation ($\psi_G,\theta_G,\varphi_G$) obtained in step S301 are set for the Kalman filter state values. The angles of rotation ($\theta_A, \varphi_A$) obtained in step S302, and the yaw angle ψM obtained in step S303, are set as the observed values, and the angular velocities (ωy,ωx,ωz) obtained in step S301 are set for the input values. The system matrices A(t), B(t), and C(t) are set as indicated by Expressions 16 and 17, and ($\psi_{Est(t)}, \theta_{Est(t)}, \varphi_{Est(t)}$) use the orientation angles estimated in the previous period. White Gaussian noise and sensor noise appropriate for the constructed system are set for the process noise m and the observed noise n, after which the process moves to step S307.

In step S307, the orientation angle computation unit 206 estimates state values ($\psi_{Est},\theta_{Est},\varphi_{Est}$), serving as orientation angles, using the Kalman filter. The Kalman filter is divided into two phases: a prediction phase, in which estimated values for the current point in time are already obtained, and an estimated value in the next phase is predicted from that information using a discrete state equation; and an update phase, in which corrections are applied to the predicted estimated values on the basis of measured values actually obtained from the sensors after the prediction phase. First, in the prediction phase, the next estimated values are estimated on the basis of the state values from the current point in time (Expression 18), after which covariance in the prediction error is calculated (Expression 19). The process then proceeds to the update phase, where the Kalman gain is updated (Expression 20), and the estimated values estimated in the prediction phase are corrected using the measured values (Expression 21). Next, the covariance of state prediction error is calculated (Expression 22), after which the process moves to step S308. A covariance matrix pertaining to the process noise m is represented by Q, and a covariance matrix pertaining to the observed noise n is represented by R.

$$\hat{X}_{(t+1)}^- = A_{(t)}\hat{X}_{(t)} + B_{(t)}u_{(t)} \qquad \text{Expression 18}$$

$$P_{(t+1)}^- = A_{(t)}P_{(t)}A_{(t)} + Q_{(t)} \qquad \text{Expression 19}$$

$$K_{(t)} = P_{(t)}^- C_{(t)}^T (C_{(t)}P_{(t)}^- C_{(t)}^T + R_{(t)})^{-1} \qquad \text{Expression 20}$$

$$\hat{X}_{(t)} = \hat{X}_{(t)}^- + K_{(t)}(y_{(t)} - C_{(t)}\hat{X}_{(t)}^-) \qquad \text{Expression 21}$$

$$P_{(t+1)} = (1 - K_{(t+1)}C_{(t)})P_{(t;1)}^- \qquad \text{Expression 22}$$

By repeating the above-described prediction phase and update phase, a state value serving as the orientation angle can continuously be estimated.

In step S308, the orientation angle computation unit 206 determines whether the geomagnetism determination result M_Calibration is "true" or "false". If the result is determined to be "true", the detection value from the geomagnetism sensor 112 is determined to be used to calculate the orientation angle, after which the process moves to step S309. However, if it is determined in step S308 that the result is "false", the process moves to step S310.

In step S309, the orientation angles ((ψEst,θEst,φEst) estimated in step S307 are output. In step S310, ψG obtained in step S301 and the orientation angles (θEst,φEst) estimated in step S307 are output.

According to the present embodiment as described thus far, by estimating orientation angle error as a drift amount, the correct orientation angle can be calculated, even in situations where an accurate output value cannot be obtained from the geomagnetism sensor, such as when a metal object is nearby, when moving to a location where geomagnetism cannot be obtained, when the geomagnetism sensor is not calibrated, and so on. The calculated orientation angle is recorded in association with images.

Note that the method of estimating and removing the orientation angle error as a drift amount is not limited to this method. The error may be removed using a method which uses a complementary filter, a Kalman filter, or the like to calculate an angular velocity from a motion vector, and the method is not limited to one in which the drift amount is estimated as an angle and removed.

Second Embodiment

Figure 7:
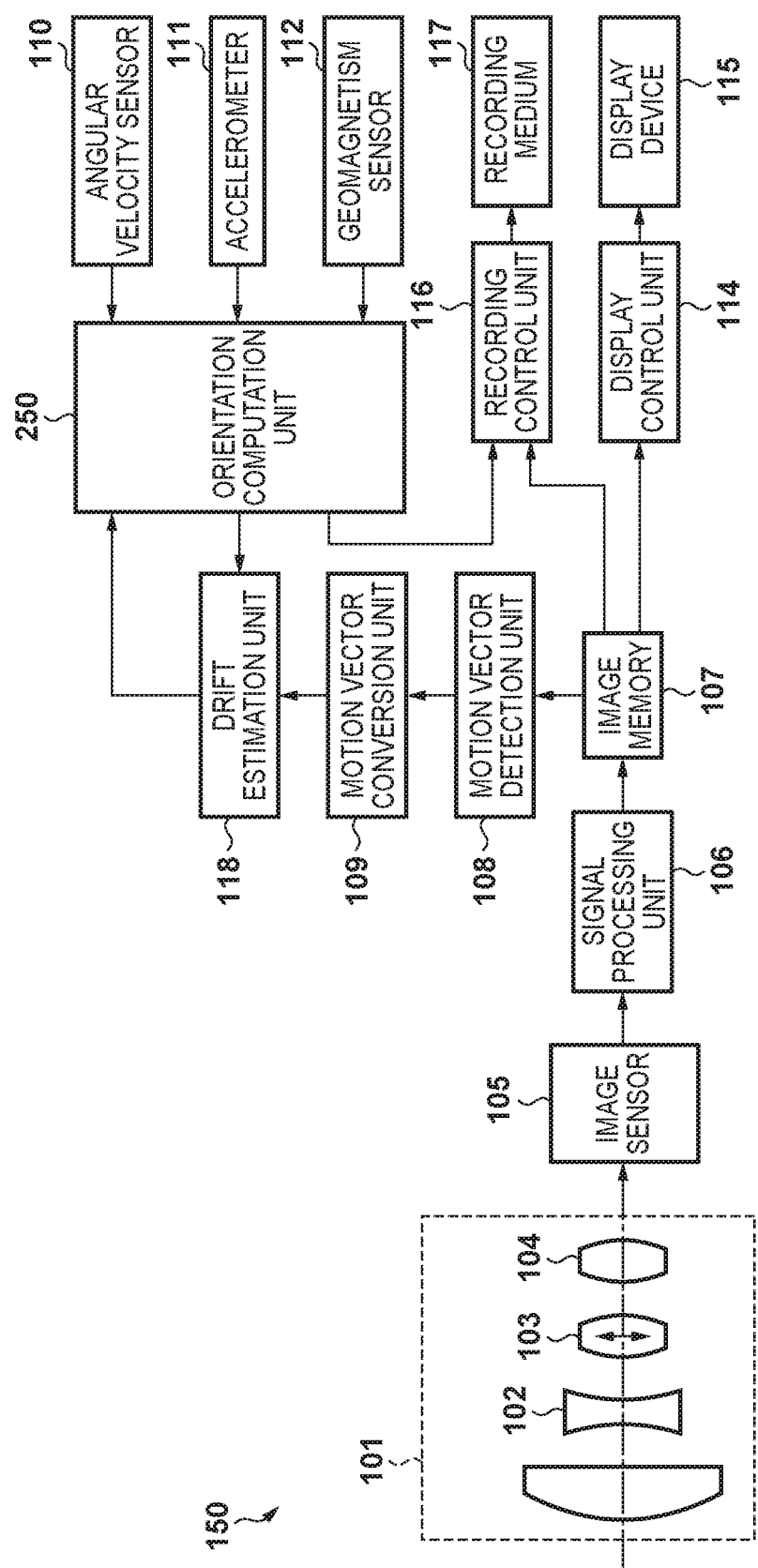
FIG. 7 is a block diagram illustrating the configuration of an image capturing system according to the second embodiment.
Figure 8:
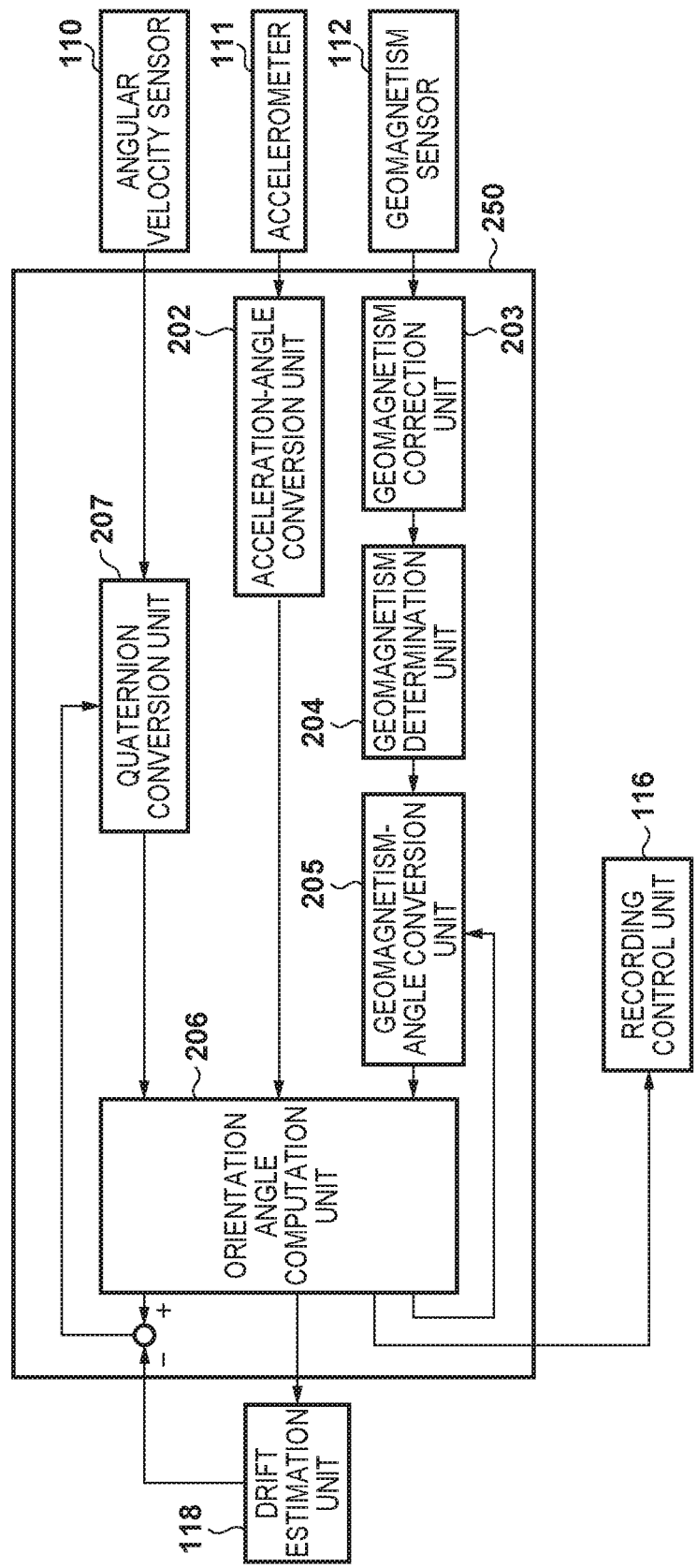
FIG. 8 is a block diagram illustrating an orientation computation unit according to the second embodiment.

FIG. 7 is a block diagram illustrating the configuration of an image capturing system 150 according to a second embodiment of the present invention. Note that elements that are the same as those illustrated in FIG. 1 will be given the same reference numerals, and will not be described. Compared to the configuration illustrated in FIG. 1, FIG. 7 removes the drift estimation unit 113, and adds a drift estimation unit 118, which carries out control different from that of the drift estimation unit 113. Furthermore, the orientation computation unit 200 illustrated in FIG. 1 has been replaced with an orientation computation unit 250, which has a different internal configuration. The configuration and operations of the orientation computation unit 250 according to the present embodiment will be described in detail below with reference to the block diagram in FIG. 8. In FIG. 8, elements that are the same as those illustrated in FIG. 4 will be given the same reference numerals, and will not be described. Compared to the configuration illustrated in FIG. 4, the configuration of the orientation computation unit 250 illustrated in FIG. 8 removes the angular velocity-angle conversion unit 201 and adds a quaternion conversion unit 207.

The first embodiment described a method in which the angular velocity-angle conversion unit 201 carried out conversion using Eulerian angles when converting the angular velocity data output from the angular velocity sensor 110 into angles of rotation. However, with Eulerian angles, when the pitch angle is vertical at ±90°, the values of sec θ and tan θ in Expression 3 become ∞, and the calculation therefore cannot be carried out. Furthermore, the closer the pitch angle is to ±90°, the greater the error becomes, producing a singularity problem. Thus the orientation of the image capturing apparatus is computed without being affected by the singularity problem, by using a quaternion, which does not have an angle. A "quaternion" is a complex number having three imaginary numbers i, j, and k, as indicated by Expression 23, which rotates a three-dimensional space in four dimensions.

$$q = q1i + q2j + q3k + q4 \quad \text{Expression 23}$$

In FIG. 8, the quaternion conversion unit 207 converts, into an angle of rotation, data obtained by subtracting the angular velocity data output from the angular velocity sensor 110 and the data output from the drift estimation unit 118 from the orientation angle data output from the orientation angle computation unit 206. First, taking the data obtained by subtracting the data of the drift estimation unit 118 from the orientation angle data output from the orientation angle computation unit 206 as ($\psi_{Est\_q}, \theta_{Est\_q}, \varphi_{Est\_q}$), the data can be converted into quaternions using Expression 24. Then, taking the angular velocity data about the Y axis, the X axis, and the Z axis output from the angular velocity sensor 110 as ($\omega y, \omega x, \omega z$), the data can be converted from an angular velocities into quaternions using Expression 25. Taking a predetermined integration time as t, a value obtained by integrating the quaternions found through Expression 25 is converted into Eulerian angles ($\psi_G, \theta_G, \varphi_G$) using the rotation matrix in Expression 26, and those angles are then output to the orientation angle computation unit 206.

$$\begin{bmatrix} q_1 \\ q_2 \\ q_3 \\ q_4 \end{bmatrix} = \begin{bmatrix} -\cos\left(\frac{\psi_{Est\_q}}{2}\right)\cos\left(\frac{\theta_{Est\_q}}{2}\right)\sin\left(\frac{\varphi_{Est\_q}}{2}\right) + \sin\left(\frac{\psi_{Est\_q}}{2}\right)\cos\left(\frac{\theta_{Est\_q}}{2}\right)\sin\left(\frac{\varphi_{Est\_q}}{2}\right) \\ -\cos\left(\frac{\psi_{Est\_q}}{2}\right)\sin\left(\frac{\theta_{Est\_q}}{2}\right)\cos\left(\frac{\varphi_{Est\_q}}{2}\right) - \sin\left(\frac{\psi_{Est\_q}}{2}\right)\cos\left(\frac{\theta_{Est\_q}}{2}\right)\sin\left(\frac{\varphi_{Est\_q}}{2}\right) \\ \cos\left(\frac{\psi_{Est\_q}}{2}\right)\sin\left(\frac{\theta_{Est\_q}}{2}\right)\sin\left(\frac{\varphi_{Est\_q}}{2}\right) - \sin\left(\frac{\psi_{Est\_q}}{2}\right)\cos\left(\frac{\theta_{Est\_q}}{2}\right)\cos\left(\frac{\varphi_{Est\_q}}{2}\right) \\ \cos\left(\frac{\psi_{Est\_q}}{2}\right)\cos\left(\frac{\theta_{Est\_q}}{2}\right)\cos\left(\frac{\phi_{Est\_q}}{2}\right) + \sin\left(\frac{\psi_{Est\_q}}{2}\right)\sin\left(\frac{\theta_{Est\_q}}{2}\right)\sin\left(\frac{\varphi_{Est\_q}}{2}\right) \end{bmatrix} \quad \text{Expression 24}$$

$$\begin{bmatrix} \dot{q}_1 \\ \dot{q}_2 \\ \dot{q}_3 \\ \dot{q}_4 \end{bmatrix} = \frac{1}{2} \begin{bmatrix} -q_4 & -q_3 & q_2 \\ q_3 & -q_4 & q_1 \\ -q_2 & q_1 & -q_4 \\ q_1 & q_2 & q_3 \end{bmatrix} \begin{bmatrix} \omega_z \\ \omega_x \\ \omega_y \end{bmatrix} \quad \text{Expression 25}$$

$$R = \begin{bmatrix} 1 - 2(q_2^2 + q_3^2) & 2(q_1q_2 + q_3q_4) & 2(q_1q_3 - q_2q_4) \\ 2(q_1q_2 - q_3q_4) & 1 - 2(q_1^2 + q_3^2) & 2(q_2q_3 + q_1q_4) \\ 2(q_2q_4 + q_1q_3) & 2(q_2q_3 - q_1q_4) & 1 - 2(q_1^2 + q_2^2) \end{bmatrix} \quad \text{Expression 26}$$

However, when the orientation angle computation unit 206 computes the orientation angle from the outputs of the quaternion conversion unit 207, the acceleration-angle conversion unit 202, and the geomagnetism-angle conversion unit 205, there are situations where the output of the geomagnetism-angle conversion unit 205 is inaccurate. Thus when the output from the geomagnetism-angle conversion unit 205 is not used, error will accumulate when the quaternions found through Expression 25 are integrated.

Accordingly, with the image capturing system 150 according to the present embodiment, the drift estimation unit 118 (described later) estimates a drift amount of the computed orientation angle on the basis of the output from the motion vector conversion unit 109 and the output from the orientation angle computation unit 206.

The drift estimation unit 118 will be described here. Note that the processing is the same for the yaw angle and the pitch angle, and thus only the control pertaining to one of these angles will be described. The drift estimation unit 118 estimates orientation angle error as the drift amount, on the basis of the output from the motion vector conversion unit 109 and the output from the orientation angle computation unit 206.

Figure 9:
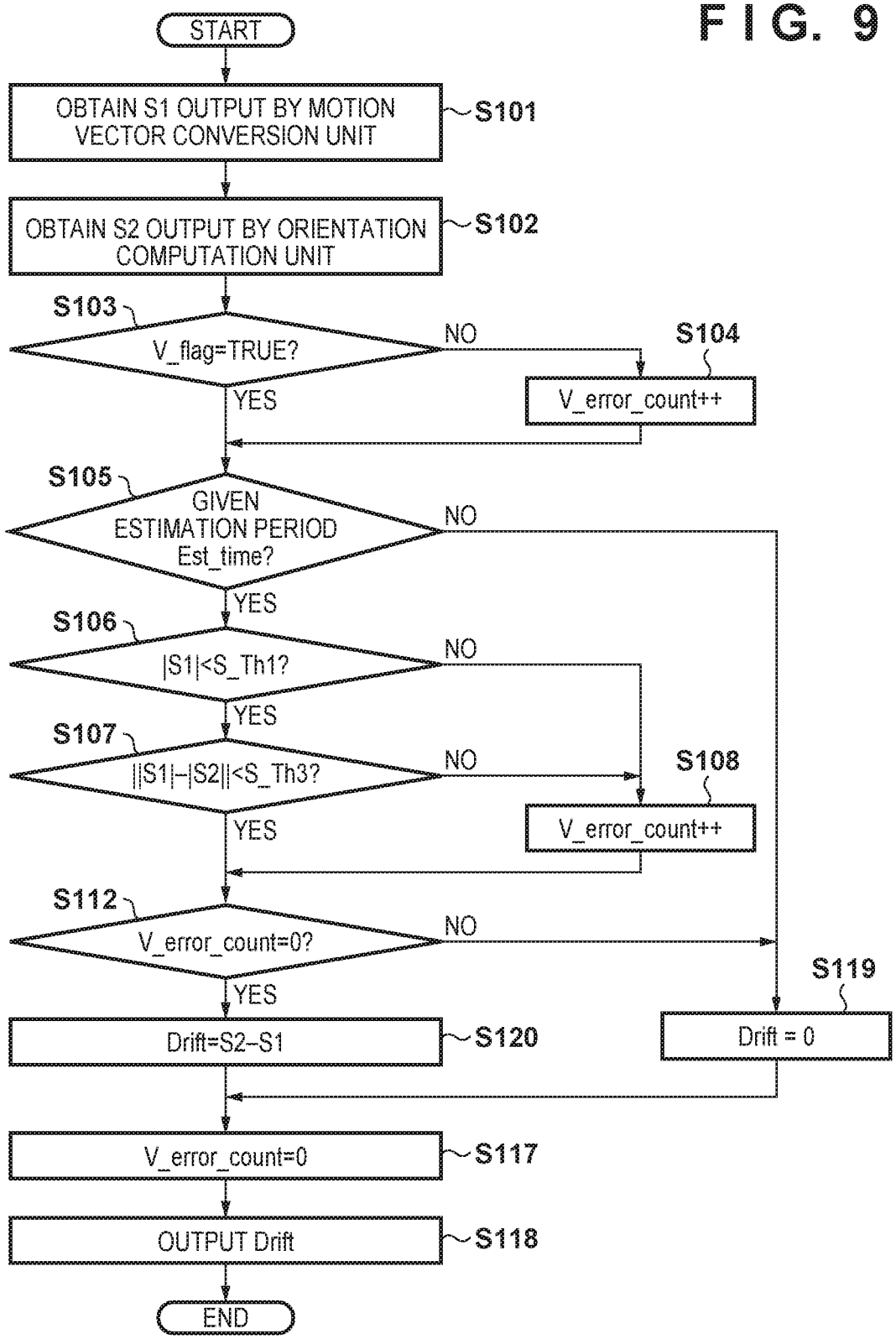
FIG. 9 is a flowchart illustrating drift amount calculation operations according to the second embodiment.

Detection error from the angular velocity sensor can be given as a cause of computation error. An example of an estimation method will be described with reference to the flowchart in FIG. 9. In FIG. 9, elements that are the same as those illustrated in FIG. 3 will be given the same reference numerals, and will not be described. Note that the processing indicated in FIG. 9 is executed repeatedly every given predetermined period, such as every period of detection by the angular velocity sensor 110. Also, a given drift estimation period is represented by Est_time.

In step S105, the drift estimation unit 118 determines whether or not the timing of the processing is the given drift estimation period Est_time. If the timing is not the given drift estimation period, the process moves to step S119, whereas if the timing is the given drift estimation period, the process moves to step S106.

In step S107, the drift estimation unit 118 subtracts an absolute value of the angle S2 from the absolute value of the angle S1, furthermore compares that absolute value (called an "absolute value of the difference" hereinafter) with a predetermined limit value S_Th3, and determines whether or not the absolute value of the difference exceeds the limit value S_Th3. If it is determined that the absolute value of the difference exceeds the limit value S_Th3, the process moves to step S108, where the drift estimation unit 118 increments the vector error count V_error_count.

The process moves to step S112 if the drift estimation unit 118 determines in step S107 that the absolute value of the difference does not exceed the limit value S_Th3. In step S112, the drift estimation unit 118 determines whether or not the vector error count V_error_count is 0. If the count is determined to be 0, the process moves to step S120, whereas if the count is determined to be a number aside from 0, the process moves to step S119.

In step S119, the drift estimation unit 118 takes the drift estimated value Drift as 0. In step S120, the drift estimation unit 118 calculates the drift estimated value Drift by subtracting the angle S1 from the angle S2.

In step S117, the drift estimation unit 118 updates the vector error count V_error_count to the initial value of 0. In step S118, the drift estimated value Drift calculated in the current drift estimation period is output.

According to the present embodiment as described thus far, by estimating orientation angle error as a drift amount, the correct orientation angle can be calculated, even in situations where an accurate output value cannot be obtained from the geomagnetism sensor, such as when a metal object is nearby, when moving to a location where geomagnetism cannot be obtained, when the geomagnetism sensor is not calibrated, and so on.

According to the present embodiment, although calculating the orientation angles using quaternions does make it difficult to know the Eulerian angles during the computation, doing so also makes it possible to carry out the computation even when the pitch angle is vertical at ±90°.

Although the foregoing embodiments described a Kalman filter as an example of a means for computing the orientation angle, a different computation method may be used. For example, focusing on the frequency characteristics of the sensors, a sensor having good low-frequency characteristics may be combined with a sensor having good high-frequency characteristics, and a complementary filter that improves the frequency range characteristics more than when using the sensors on their own may be used. A particle filter using the Monte Carlo method may be used for estimating the probability density of a next state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083211, filed on Apr. 24, 2019, which is hereby incorporated by reference herein in its entirety.

What is claimed is:
1. An image capturing apparatus, comprising:
an angular velocity detection sensor that detects an angular velocity of movement of the image capturing apparatus;
an acceleration detection sensor that detects an acceleration of the movement of the image capturing apparatus;
a geomagnetism detection sensor that detects geomagnetism acting on the image capturing apparatus; and
at least one processor or circuit configured to function as:
a motion vector detection unit that detects a motion vector on the basis of an image captured by the image capturing apparatus;
a determination unit that determines a reliability of the detection value from the geomagnetism detection sensor; and
a calculation unit that calculates an orientation angle of the image capturing apparatus on the basis of a detection value from the angular velocity detection sensor, a detection value from the acceleration detection sensor, a detection value from the motion vector detection unit, and a detection value from the geomagnetism detection sensor,
wherein the calculation unit corrects an output of the angular velocity detection sensor using the detection value obtained by the motion vector detection unit, and calculates the orientation angle of the image capturing apparatus on the basis of the corrected output, and
wherein the calculation unit determines whether or not to use the detection value from the geomagnetism detection sensor in the calculation of the orientation angle of the image capturing apparatus on the basis of a determination result from the determination unit.

2. The image capturing apparatus according to claim 1, wherein the calculation unit calculates the orientation angle of the image capturing apparatus as an orientation angle in a coordinate system based on an axis for which an acceleration does not change.

3. The image capturing apparatus according to claim 1, wherein when the determination unit has determined that the reliability of the geomagnetism detection sensor is greater than or equal to a predetermined value, the calculation unit uses the detection value from the geomagnetism detection sensor in the calculation of the orientation angle of the image capturing apparatus.

4. The image capturing apparatus according to claim 3, wherein when the determination unit has determined that the reliability of the geomagnetism detection sensor is lower than the predetermined value, the calculation unit does not use the detection value from the geomagnetism detection sensor in the calculation of the orientation angle of the image capturing apparatus.

5. The image capturing apparatus according to claim 1, wherein the at least one processor or circuit is configured to further function as:
a notification unit that notifies a user when the determination unit has determined that the reliability of the geomagnetism detection sensor is lower than a predetermined value.

6. The image capturing apparatus according to claim 1, wherein the at least one processor or circuit is configured to further function as:
an estimation unit that estimates calculation error of the calculation unit using the orientation angle of the image capturing apparatus obtained by the calculation unit and the detection value obtained from the motion vector detection unit, and
wherein the calculation unit calculates the orientation angle of the image capturing apparatus on the basis of the detection value from the angular velocity detection sensor, the detection value from the acceleration detection sensor, the detection value from the geomagnetism detection sensor, and an estimated value from the estimation unit.

7. The image capturing apparatus according to claim 1, wherein the at least one processor or circuit is configured to further function as:
a recording unit that records information based on the orientation angle calculated by the calculation unit, the information being recorded in association with an image.

8. The image capturing apparatus according to claim 2, wherein the calculation unit calculates the orientation angle of the image capturing apparatus using a Eulerian angle.

9. The image capturing apparatus according to claim 1, wherein the calculation unit calculates the orientation angle of the image capturing apparatus using a quaternion.

10. A control method for an image capturing apparatus, the method comprising:
detecting an angular velocity of movement of the image capturing apparatus;
detecting an acceleration of the movement of the image capturing apparatus;
detecting geomagnetism acting on the image capturing apparatus;
detecting a motion vector on the basis of an image captured by the image capturing apparatus;
calculating an orientation angle of the image capturing apparatus on the basis of a detection value obtained from detecting the angular velocity, a detection value obtained from detecting the acceleration, a detection value obtained from detecting the motion vector, and a detection value obtained from detecting the geomagnetism; and
determining a reliability of the detection value obtained from detecting the geomagnetism,
wherein in the calculating, an output obtained from detecting the angular velocity is corrected using the detection value obtained from detecting the motion vector, and the orientation angle of the image capturing apparatus is calculated on the basis of the corrected output, and
wherein whether or not to use the detection value obtained from detecting the geomagnetism in the calculating of the orientation angle of the image capturing apparatus is determined on the basis of a determination result obtained from determining of the reliability.

11. An orientation angle calculation apparatus, comprising:
at least one processor or circuit configured to function as:
an angular velocity obtainment unit that obtains angular velocity information of movement of an image capturing apparatus;
an acceleration obtainment unit that obtains acceleration information of the movement of the image capturing apparatus;
a motion vector obtainment unit that obtains motion vector information based on an image captured by the image capturing apparatus;
a geomagnetism obtainment unit that obtains geomagnetism information acting on the image capturing apparatus;
a determination unit that determines a reliability of the geomagnetism information obtained by the geomagnetism obtainment unit; and
a calculation unit that calculates an orientation angle of the image capturing apparatus on the basis of the angular velocity information obtained by the angular velocity obtainment unit, the acceleration information obtained by the acceleration obtainment unit, the motion vector information obtained by the motion vector obtainment unit, and the geomagnetism information obtained by the geomagnetism obtainment unit,
wherein the calculation unit corrects the angular velocity information obtained by the angular velocity obtainment unit using the motion vector information obtained by the motion vector obtainment unit, and calculates the orientation angle of the image capturing apparatus on the basis of the corrected information, and
wherein the calculation unit determines whether or not to use the geomagnetism information obtained by the geomagnetism obtainment unit in the calculation of the orientation angle of the image capturing apparatus on the basis of a determination result from the determination unit.

* * * * *